United States Patent
Baker

[15] 3,695,750
[45] Oct. 3, 1972

[54] COMPACT FOUR ELEMENT OBJECTIVE LENS

[72] Inventor: James G. Baker, Winchester, Mass.

[73] Assignee: Polaroid Corporation, Cambridge, Mass.

[22] Filed: July 28, 1971

[21] Appl. No.: 166,933

Related U.S. Application Data

[63] Continuation-in-part of Ser. No. 774,141, Nov. 7, 1968, Pat. No. 3,619,036.

[52] U.S. Cl. .................................. 350/221, 350/255
[51] Int. Cl. ....................................... G02b 9/36
[58] Field of Search ................................. 350/221

[56] References Cited

UNITED STATES PATENTS 2,338,614  1/1944  Aklin .................. 350/221
2,503,789  4/1950  Wood et al. .......... 350/187 UX

FOREIGN PATENTS OR APPLICATIONS 24,391  11/1905  Great Britain ............ 350/221

Primary Examiner—John K. Corbin
Attorney—Charles Mikulka et al.

[57] ABSTRACT

A compact air-spaced four element photographic objective lens is shown with an overall length less than one-tenth its focal length. Chromatic and spherical aberrations, coma, astigmatism, field curvature, and distortion are corrected. Focusing is accomplished by a movable first element. The corrections are optimum when the objective focuses a subject approximately nine focal lengths distant. The ratio of the minimum Abbé $\nu$ value of the first and fourth elements to the maximum Abbé $\nu$ value of the second and third elements (i.e., Baker's Ratio) is 0.91. The Petzval sum is 0.199.

2 Claims, 2 Drawing Figures

| F = 1.000 | | L.O.A. = .0945F | | f/8.0 |
|---|---|---|---|---|
| LENS | $n_d$ | $\nu_d$ | RADII | THICKNESSES |
| I | 1.678 | 55.2 | $R_1$= +.2182F | $t_1$ = .0188F |
| | | | $R_2$= PLANO | $.0057F \leq s_1 \leq .0597F$ |
| II | 1.511 | 60.4 | $R_3$= −.5772F | $t_2$ = .0079F |
| | | | $R_4$= +.3267F | $s_2$ = .0105F |
| III | 1.626 | 35.7 | $R_5$= −.5302F | $t_3$ = .0079F |
| | | | $R_6$= +.3385F | $s_3$ = .0270F |
| IV | 1.651 | 55.9 | $R_7$= +1.1217F | $t_4$ = .0167F |
| | | | $R_8$= −.2664F | $s_4$ = .9981F |

INVENTOR.
JAMES G. BAKER

BY
Brown and Mikulka
and
Fredrick H. Brustman
ATTORNEYS

COMPACT FOUR ELEMENT OBJECTIVE LENS

This application is a continuation-in-part of my prior copending application, Ser. No. 774,141, filed Nov. 7, 1968, now U.S. Pat. No. 5,619,036.

BACKGROUND OF THE INVENTION

Four element lens systems comprising outer positive elements with inner negative elements have long been known. These systems of early vintage usually consisted of outer positive elements which had the same, or substantially the same, indices of refraction and Abbé $\nu$ values, and of inner negative elements which also had the same, or substantially the same, indices of refraction and Abbé $\nu$ values. Generally, the positive elements had higher indices of refraction and higher Abbé $\nu$ values than the inner negative elements. This simple construction led to an approximately symmetrical objective for an infinitely long conjugate and for 1:1 conjugates to an exactly symmetrical objective. The lens systems of this general design as known in the prior art are not especially compact; in some instances, the overall length is more than one third the focal length. The correction for field curvature as represented by the Petzval sum, P, is not optimum, either, in the majority of prior art lenses of this general four-element configuration.

The design of useful photographic objectives requires consideration of the correction of many different aberrations inherent in optical lens systems. Some of the aberrations which must be dealt with, and which the optical designer must seek to correct, include lateral and longitudinal chromatic aberrations, coma, astigmatism, field curvature and distortion. Correction of the chromatic aberrations is particularly important in modern photographic objectives because of the wide-spread use of color photographic films. In treating these aberrations and in attempting to find solutions within the other desired parameters of a photographic objective, for example size and cost of the final design, the designer must deal with the results of many simultaneous solutions of many non-linear equations that are closely related mathematically, even if they must be treated in segments. The effect of several of these aberrations on the design of a compact, well-corrected photographic objective are considered in my copending application, Ser. No. 774,141.

The chromatic aberrations of an optical system are of two distinct types, i.e., longitudinal and lateral.

Longitudinal chromatic aberration results from the lens having a different image location along the axis for each wavelength of light, because the index of refraction is different for each wavelength of light. Lateral chromatic aberration is the designation given to the formation of color images of different size because of differences in magnification caused by focal length dependence on wavelength. This defect can remain even in a lens which is corrected for longitudinal chromatism.

The corrections for longitudinal and lateral chromatic aberrations are achieved in two different manners. A classical correction for longitudinal chromatic aberration is the use of closely spaced, typically contacting, pairs of optical elements. These pairs, generally known as achromatic doublets, are constructed from two different glasses, one having a large Abbé $\nu$ value used for the stronger or convergent element in the doublet. The weaker or divergent element of the achromatic doublet is typically made from a glass having a lower Abbé $\nu$ value. In older art the stronger or convergent element typically had the lower index of the pair of glasses, but in more recent practice a wider choice of indices prevails, according to other requirements. The shapes of the respective elements can be determined through the use of formulas known to those skilled in the art. The result is a pair of lenses which in combination tend to cancel each other's dispersion, but which have a net optical power other than zero. This result is achieved because of the relatively large differences in dispersion between the types of optical glass employed. The achromatic doublet so described, composed of a closely spaced, contacting pair of elements, is also substantially corrected for lateral color without further design control. This comes about because, for very thin lens elements in contact, the principal planes for the several wavelengths will all lie fairly close to each other. The focal lengths for these wavelengths will then be approximately the same. The sizes of the respective images for different wavelengths of light will then be approximately equal in the common image plane produced by the prior correction for longitudinal chromatic aberration, and the lateral chromatic aberration is thereby minimized.

The approximate correction described above for lateral chromatic aberration inherent in a thin achromatic doublet does not hold in the case of thick lens elements nor for lens elements which are not nearly in contact with each other. Such a thick, or air-spaced, doublet will then suffer from lateral chromatic aberration even though corrected for longitudinal chromatic aberration. This is so because for thick lenses, and for lenses physically separated from each other, the principal planes for the several wavelengths of light, do not lie close together. Thus, while several wavelengths may have a common image plane whereby longitudinal chromatic aberration is corrected, the focal lengths for the several wavelengths will be different, resulting in a different size of image for the different wavelengths even though the images lie in a common plane. An air-spaced doublet cannot therefore be corrected simultaneously for longitudinal and lateral chromatic aberrations unless further compounded.

If longitudinal chromatic aberration is not corrected, then lateral chromatic aberration can be eliminated in a fairly simple manner by the use of two lens elements, even though made from the same type of optical material. This type of correction for lateral chromatic aberration is achieved by the use of an air space between the two elements which is equal to one half the sum of the focal lengths of the two elements. This correction for lateral chromatic aberration yields the same magnification for every wavelength of light, but the various images will lie in different image planes. It can be seen, then, that this correction for lateral chromatic aberration introduces strong longitudinal chromatic aberration. The solution, therefore, is unsatisfactory by itself for use in photographic objectives which are required to bring the images of various wavelengths into a common plane in which a photosensitive material can be placed. In the above solution for lateral chromatic aberration, it will be appreciated that to form an optical system of reasonable size the two elements which are to be spaced apart should be of opposite, but not equal power.

It has been a common practice to reduce or to eliminate lateral chromatic aberration by combining elements into similar but opposed groupings on either side of a central stop. In this way the prismatic dispersions of the chief rays can be made more or less equal in magnitude but opposite in algebraic sign for the two groupings. The system as a whole will then show little or no final dispersion of the chief rays at the image plane, even though in either grouping separately, a very large dispersion of the chief rays exists. Then also, in the prior art it has been the practice to correct each group separately for longitudinal chromatic aberration, which then remains corrected for the system when the two groupings are combined. The combination of two elements for each grouping on either side of a central stop or plane of symmetry in the prior art then permitted the designer to employ thick lens elements, or large air spaces, or both, to achieve simultaneous corrections for longitudinal and lateral chromatic aberrations and other monochromatic aberrations. Because of this, the overall length of this general class of photographic objectives has been considered to be an inconsequential result of the design for correcting the chromatic aberrations. This assumption has placed an artificial limitation on the compactness which can be achieved in a photographic camera.

It has been a common practice to achieve a flattening of the image field by making use of comparatively large air spaces between the positive and negative lens elements where the freedom to correct the chromatic aberrations by choice of glasses and approximate symmetry has been retained. It is known that the nature of the Petzval sum, P, which is the curvature or reciprocal radius of an anastigmatic image surface, requires that the collective negative lens powers of the system be only somewhat smaller in numerical magnitude than the collective positive powers of the system. The net power of the system, however, depends on this similar sum of the individual powers, as modified by the air spaces. It has been assumed that, if the net power of the system is to be acceptably large, the air spaces must be large. In the prior art compromises have been made, resulting in both an overall length between front and rear elements amounting to a large fraction of the focal length of the system, and in some residual curvature of field arising from too large a value for the Petzval sum, P, in different measures.

This invention, by contrast, considers the overall barrel length as a variable which can be controlled to achieve an intentionally compact, well corrected photographic objective lens.

BRIEF SUMMARY OF THE INVENTION

Among the principal objects of this invention are to provide:

a very compact photographic objective;

one which is well corrected for longitudinal and lateral chromatic aberrations;

one having an approximately flat field, represented by a Petzval sum less than 0.225;

one which is well corrected for spherical aberration, coma, astigmatism and distortion;

a lens whose overall length does not exceed one eighth its focal length; and a lens which is focused by adjusting the front element, having an approximately constant back focal distance, which remains sufficiently well corrected for all aberrations throughout a range of object distances from three times the focal length to infinity.

These and other objects of the invention are accomplished by a compact four element lens system of two divergent lenses surrounded by two convergent lenses which exhibits a particular relationship between the Abbé $\nu$ values of the outer lenses and the Abbé $\nu$ values of the inner elements. The special relationship to be observed in accordance with this invention is that the minimum Abbé $\nu$ value of the two outer elements does not exceed 1.2 times the maximum Abbé $\nu$ value of the two inner elements. This relationship can be expressed as a ratio, hereinafter referred to as Baker's Ratio, thus:

$$\frac{\nu_1, 4 \text{ min.}}{\nu_2, 3 \text{ max.}} < 1.2$$

By maintaining the value of Baker's Ratio below 1.2, it is possible to construct a compact well-constructed lens with overall length not exceeding one-eighth the focal length and approximately flat field with a Petzval Sum less than 0.225.

The present formula sets forth the radii and spacings necessary to provide an optimum correction for aberrations across an image field having a diagonal equal to one focal length when the objective lens focuses on a subject 9.2 focal lengths away.

DESCRIPTION OF THE DRAWINGS

Additional objects and advantages of the invention are more fully set forth in the accompanying detailed description taken together with the accompanying drawings wherein.

DETAILED DESCRIPTION

Figures 1, 2:
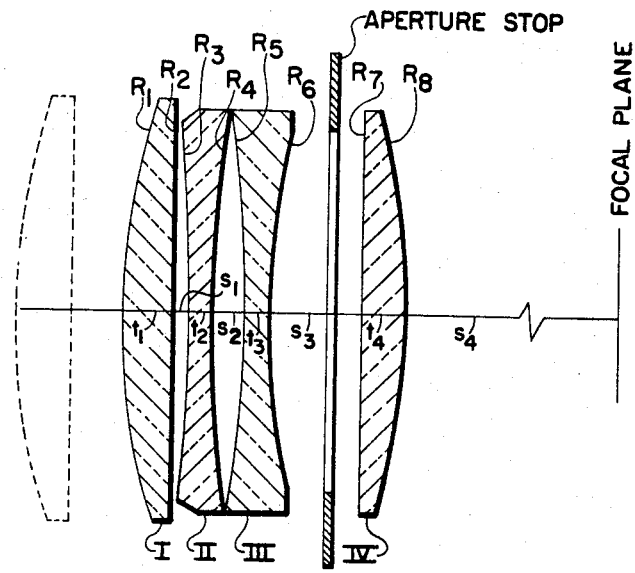
FIG. 1 is a cross-sectional view of a compact, well-corrected photographic objective according to the invention in which focusing is accomplished by adjustment of the front element.
FIG. 2 gives the constructional data, based on unit focal length, for the objective lens of FIG. 1.

FIG. 1 shows a very compact four element photographic objective lens. Lens elements I through IV are numbered in order from the long conjugate or front side of the objective lens to the short conjugate or rear of lens. Lens element I is shown in the position for which the compact photographic objective is focused at infinity. The dotted lines represent the position of lens element I when the objective lens is focused on an object approximately three times its focal length away. As seen in the figure, element I and element IV are both convergent lenses while elements II and III are biconcave divergent elements. Air-space $S_1$ is very short when the objective lens system is focused at infinity. Air space $S_1$ increases in size as the front element I is adjusted to focus the photographic objective lens system on an object nearby. Air space $S_2$ forms a negative air lens between elements II and III. The size of air space $S_2$ remains constant. The space $S_3$ between lenses III and IV is the largest of the air spaces. The size of air space $S_3$ also remains constant. The relatively large size of $S_3$ permits the location of an aperture stop between elements III and IV. It is also possible, in this comparatively large air space, to utilize a between-the-lens shutter at this location.

Element I is a plano-convex lens. The first surface $R_1$ has a relatively strong curvature. The second surface $R_2$ has no curvature. The radius $R_3$ on element II is noticeably curved but is not the strongest curve in the lens system. The surfaces $R_4$, $R_5$ and $R_6$ have intermediate curvatures which are stronger than $R_3$ but weaker than $R_1$ and $R_8$. The surface represented by $R_7$ has only a slight curve and appears nearly planar. The surface $R_8$ on element IV has strong curvature.

The unusual compactness of the photographic objective shown in FIG. 1 permits the construction of a very compact photographic camera. The constant back focal distance of the objective, due to the use of front element focusing, permits a photographic camera design wherein the angular field remains substantially the same for all object distances. Front element focusing requires much less forward clearance for lens movement than focusing the entire lens system requires.

The formula below gives constructional data for an objective lens according to generic teachings set forth in my copending United States patent application, Ser. No. 774,141. The present objective lens has an optimum correction at a subject distance of 9.2 focal lengths and a useful field with a diameter equal to one focal length.

It should be understood that for any particular application of the invention, a preferred region of the spectrum may be used in the design. For consistency herein, index $n$, Abbé value $\nu$, and Petzval sum P, have been chosen or calculated for the Helium $d$-line. L.O.A. designates the overall length of the objective lens, when set to focus at infinity, between surfaces $R_1$ and $R_8$. The maximum value of $S_1$ prevails when the lens is focused on an object separated from the objective by 2.2 focal lengths.

F = 1.000     L.O.A. = 0.0945F     f/8.0

| Lens | $n_d$ | $\nu_d$ | Radii | Thicknesses |
|---|---|---|---|---|
| I | 1.678 | 55.2 | $R_1 = +0.2182F$ | $t_1 = 0.0188F$ |
|  |  |  | $R_2$ = plano | $0.0057F \leq s_1 \leq 0.0597F$ |
| II | 1.511 | 60.4 | $R_3 = -0.5772F$ | $t_2 = 0.0079F$ |
|  |  |  | $R_4 = +0.3267F$ | $s_2 = 0.0105F$ |
| III | 1.626 | 35.7 | $R_5 = -0.5302F$ | $t_3 = 0.0079F$ |
|  |  |  | $R_6 = +0.3385F$ | $s_3 = 0.0270F$ |
| IV | 1.651 | 55.9 | $R_7 = -1.1217F$ | $t_4 = 0.0167F$ |
|  |  |  | $R_8 = -0.2664F$ | $s_4 = 0.9981F$ |

Baker's Ratio: 0.91
Petzval Sum: 0.199

In a successful photographic objective for commercial use an important consideration is the presence of curvature of the photographic objective's image field. The severity of this defect is commonly measured by a term known as the Petzval sum, P. The Petzval sum is dependent solely on the indices of refraction and surface curvatures of the individual elements of the objective. The curvature of field represented by the Petzval sum should not ordinarily, in a practical lens, be made zero; a compromise between Petzval field flatness and higher order aberrations must be accepted, otherwise the complete correction of one will be at an unacceptable cost to the correction of the other. A value of the Petzval sum, P, of 0.225 is maximum for a lens of this genus when used in conjunction with the typically flat commercial photosensitive materials.

In the invention embodied in the objective lens disclosed herein the manipulation of the components with regard to Baker's Ratio has made it possible to achieve a field flatness, as measured by the Petzval sum, superior to that of any other photographic objective known to the art which has a relatively short barrel length.

In calculations for short barrel objective lens systems, it has been discovered that the correction for several aberrations benefit by having the Abbé $\nu$ values of the second element rather large compared to that of the third element. The third surface of this compact objective is one of strong refraction, governing a good part of the chromatic spherical aberration and off-axis aberrations of the lower rim rays. It has, therefore, a strong tendency to cause too large an inward refraction of the lower rim rays for the shorter wavelengths, an aberration that can be reduced if the Abbé $\nu$ value of the second element is raised to provide less color dispersion. The requirement for an on-axis longitudinal chromatic correction thereafter in the lens system causes the dispersion number of the third element to be lower than it otherwise would be, but still of moderate value because of the desired short lens barrel.

Color correction is improved by using a lower Abbé $\nu$ value for either of the outlying convergent elements and an increased Abbé $\nu$ value for either of the inner divergent elements, compared to the simple case where the divergent elements have substantially the same Abbé $\nu$ value as each other and the convergent elements have substantially the same Abbé $\nu$ value. Several considerations, discussed in my above referenced application, lead to the desirability of having the greatest value of Abbé $\nu$ value in the second element. This desired relationship of dispersive values of the various elements is expressed in the form of Baker's Ratio which has been defined above. Baker's Ratio should not exceed 1.2 for lenses made according to the teachings of this invention.

Since certain changes may be made in the above objective lens system without departing from the scope of the invention herein involved, it is intended that all matter contained in the above description or shown in the accompanying drawing shall be interpreted as illustrative and not in a limiting sense.

What is claimed is:

1. A compact, four element, photographic objective lens having the design parameters for a unit focal length, F, presented in the following table:

F = 1.000     L.O.A. = 0.0945F     f/8.0

| Lens | $n_d$ | $\nu_d$ | Radii | Thicknesses |
|---|---|---|---|---|
| I | 1.678 | 55.2 | $R_1 = +0.21821F$ | $t_1 = 0.0188F$ |
|  |  |  | $R_2$ = plano | $0.0057F \leq s_1 \leq 00597F$ |
| II | 1,511 | 60.4 | $R_3 = -0.5772F$ | $t_2 = 0.0079F$ |
|  |  |  | $R_4 = +0.32670F$ | $s_2 = 0.0105F$ |
| III | 1.626 | 35.7 | $R_5 = -0.5302F$ | $t_3 = 0.0079F$ |
| III | 1.626 | 35.7 | $R_6 = +0.3385F$ | $s_3 = 0.0270F$ |
| IV | 1.651 | 55.9 | $R_7 = 1217F$ | $T_4 = 0.0167F$ | wherein Roman numerals identify lens elements in order from front to rear; $n_d$ is the refractive index at 587.6 nanometers; $\nu_d$ is Abbé's ratio; $R_1$, $R_2$, . . . represent radii of successive refractive surfaces from front to rear; $t$ and $s$ represent thicknesses of lens elements and air spaces, respectively.

2. The compact, four element, photographic objective lens described in claim 1 wherein focusing is accomplished by moving the first element, Lens I, with respect to the others.

* * * * *